July 15, 1969  R. A. SNOOK  3,455,311
CANOPY SUPPORT DEVICE FOR HARVESTERS
Filed July 19, 1967  3 Sheets-Sheet 1
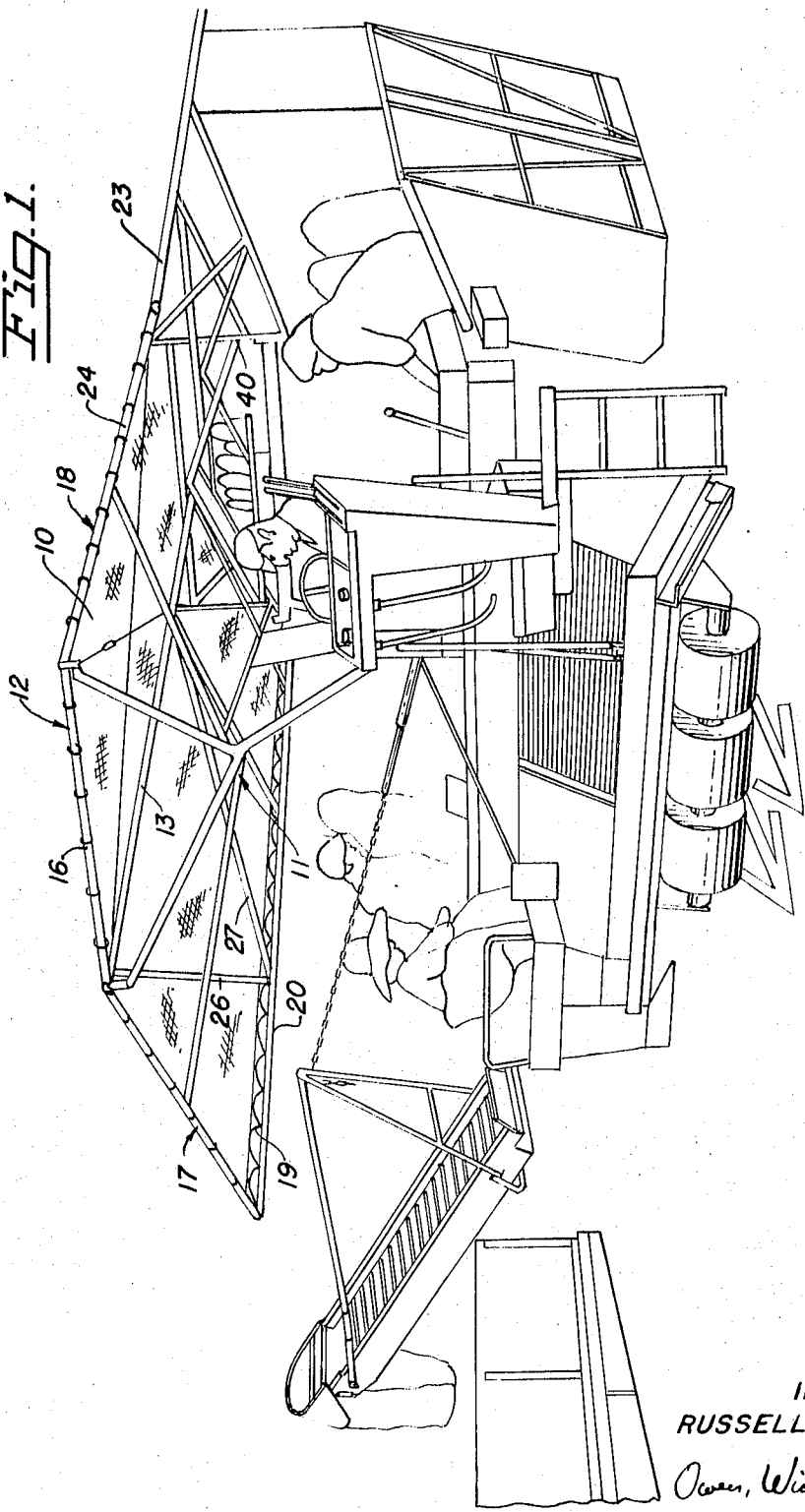
INVENTOR
RUSSELL A. SNOOK
ATTORNEYS

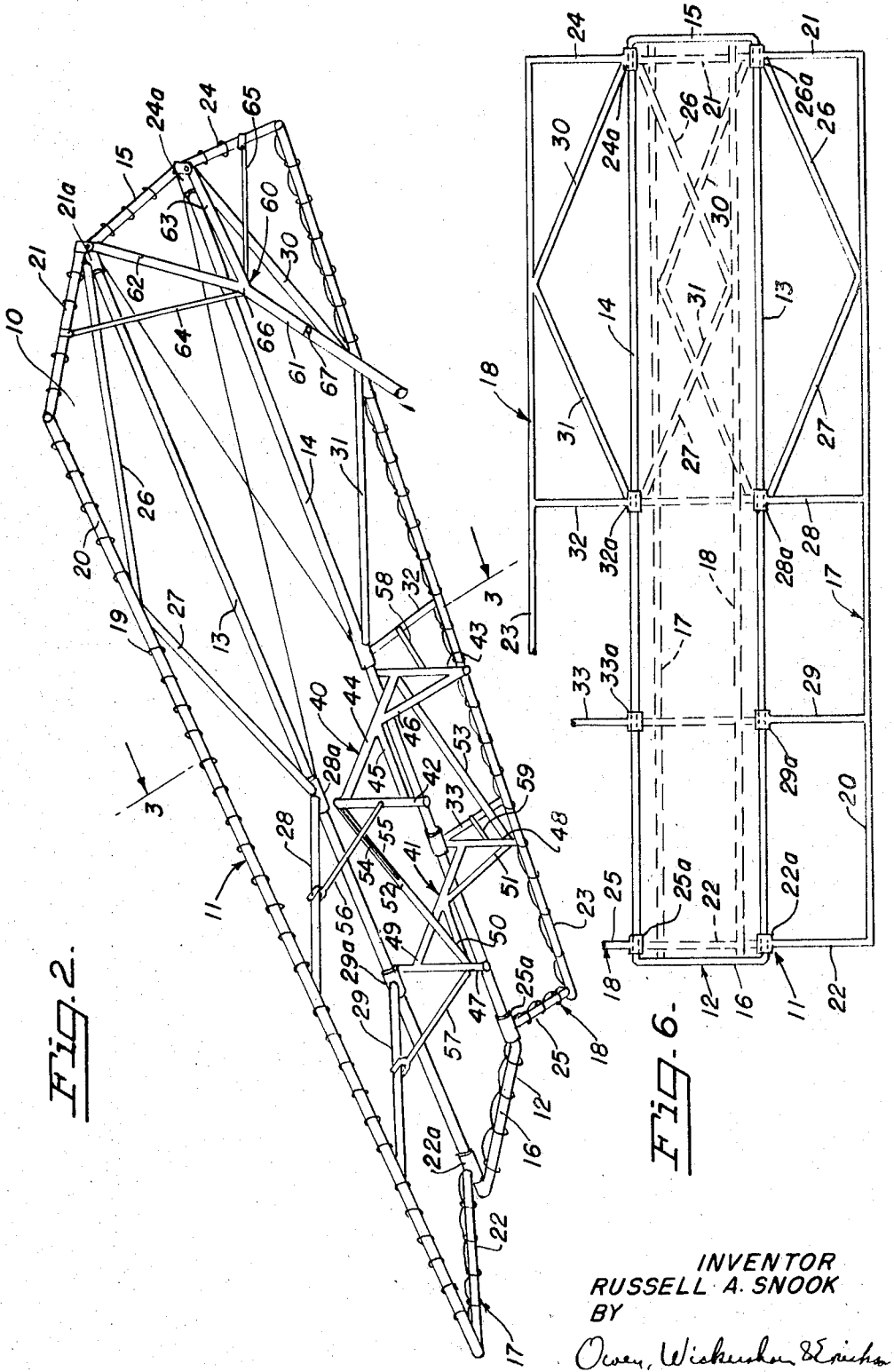

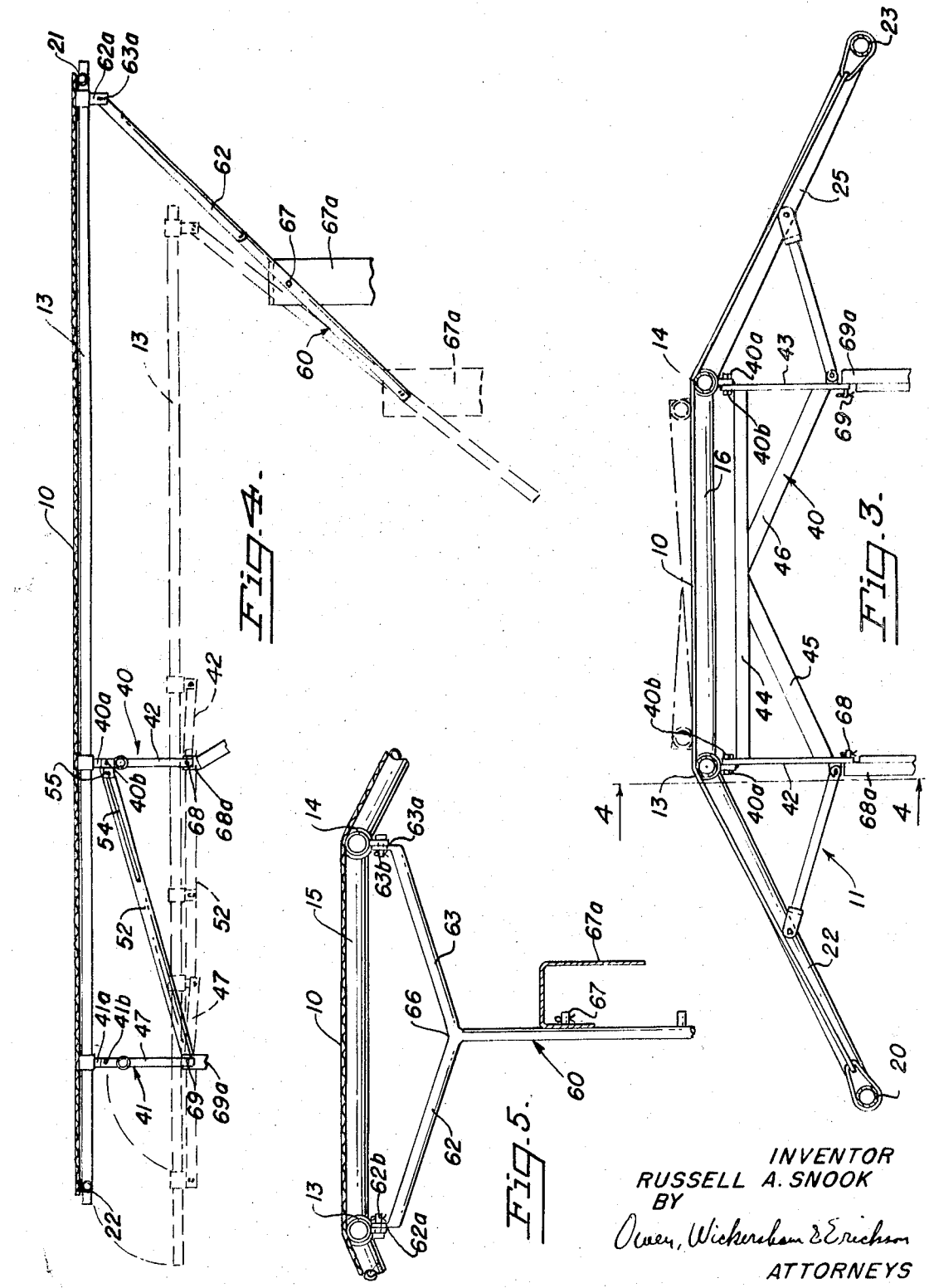

United States Patent Office 3,455,311
Patented July 15, 1969

3,455,311
CANOPY SUPPORT DEVICE FOR HARVESTERS
Russell A. Snook, Morgan Hill, Calif., assignor to The Regents of the University of California, Berkeley, Calif.
Filed July 19, 1967, Ser. No. 654,428
Int. Cl. E04f 10/04
U.S. Cl. 135—5                                      6 Claims

ABSTRACT OF THE DISCLOSURE

A canopy support device for harvesters has a horizontal central subframe comprising a pair of longitudinal parallel members joined rigidly by a pair of parallel end members and a pair of side subframe pivoted to the central subframe each having a pair of end members and a longitudinal member, which, in folded position, lie flat over the central subframe, one over the other. In use position, they extend out beside the central subframe and slope down therefrom. Forward and rear subframe are pivoted on a horizontal axis to the central subframe for relative movement between a generally vertical use position and a folded horizontal position.

---

This invention relates to a canopy and canopy support for harvesting devices.

In some kinds of harvesting devices, sorting is done in the field. For example, in tomato harvesting a crew of sorters culls out objectionable tomatoes in order to leave a mechanically harvested crop that is acceptable to the canner. These crews have to work a long, hot day, for most canning tomatoes are grown and harvested in areas where at harvesting time the sun is very bright and very hot, and the comfort of the sorters affects the quality of their work.

One object of the present invention is to increase the comfort of the sorters by providing a canopy over the heads of the workers. The canopy also, of course, affords some protection to the crop itself.

Such a canopy cannot ordinarily be a permanently erected structure because it would be too high to pass under some of the clearances where the harvester may have to travel on its way to and from harvesting and would be too high for the storage sheds where it is kept in off-seasons. The erected canopy also necessarily extends too wide beyond the side edges for compact storage of the harvesters. In this conjunction it may be noted that sometimes the sorters' stations are removed from the harvester when storing it from one season to the next. Consequently, it is important that the canopy which protects the workers be large enough when in use and yet be readily folded in to make it narrow and then folded down lower to substantially reduce the total height of the machine. The present invention is directed particularly to the achievement of these problems.

Several subordinate problems exist, which will be explained and dealt with in the explanation of the invention which follows, and other objects and advantages of the invention will appear from the following description of a preferred embodiment.

In the drawings:

FIG. 1 is a view in perspective of a tomato harvester embodying the principles of the invention, showing the canopy erected and sheltering the sorters. The rear portion is broken off to conserve space.

FIG. 2 is a view in perspective, looking from below, of the canopy and canopy support of the harvester of FIG. 1.

FIG. 3 is a view in transverse section through the canopy and support of FIG. 2, taken along the line 3—3 in FIG. 2. In broken lines, the collapsed position is shown. Some parts are broken off, in order to conserve space.

FIG. 4 is a view in section taken along the line 4—4 in FIG. 3, with some parts broken away or broken off and also illustrating how the device folds, showing the assembly in its collapsed position in broken lines.

FIG. 5 is a fragmentary view in front elevation of the central portion of the canopy and support.

FIG. 6 is a top plan view of the canopy support frame, with a portion broken off in order to conserve space and with the vertical support members removed.

FIGS. 1 and 2 show the canopy and canopy support of the invention and illustrate how it appears in its erected form and how it shelters the workers.

Basically, the invention comprises a canvas covering 10 supported by a framework 11 and secured to it by ropes 19. The framework 11 is made of many subframe units and portions. Thus, there is a central horizontal subframe 12 comprising longitudinal members 13 and 14 rigidily joined by end members 15 and 16.

On each side of the horizontal central subframe 12 are two pivoted side subframe 17 and 18, normally inclined downwardly from the subframe 12, when the device is erected. The subframe 17 comprises a longitudinal member 20 and rigidly connected to the member 20, end members 21 and 22, which are themselves pivotally mounted with respect to the member 13 of the subframe 12, by means of collars 21a and 22a so that the entire subframe 20 can be swung over on top of the subframe 12. The subframe 17 is about the same size as the subframe 12, so that when it is folded over it, the total width is no greater than that of the central subframe 12.

The subframe 18 is substantially identical to the subframe 17 and comprises a longitudinal member 23 rigidly connected to end frame members 24 and 25, which are pivotally mounted with respect to the longitudinal member 14 of the central subframe 22, by means of collars or sleeves 24a and 25a so that this side frame 18 can also be swung over on top of the subframe 12. It makes no difference which subframe 17 or 18 as swung over first. When both of them are swung over, they appear as in FIG. 3 and are quite compact.

The subframe 17 is strengthened by a pair of diagonal members 26 and 27 and by a pair of transverse members 28 and 29, which lie parallel to the end member 22. The members 26, 27, 28 and 29 are all rigidly secured to the subframe 17 and are pivotally attached to the member 13 of the subframe 12 by means of sleeves 28a and 29a. Similarly, the subframe 18 has diagonally extending members 30 and 31 and transverse members 32 and 33, which lie parallel to the member 25 and are rigidly attached to the subframe 18 but pivotally mounted by means with respect to the member 14 by means of sleeves 32a and 33a to enable the folding over already described.

Two vertical subframe members 40 and 41 are provided, the subframe 40 being near the center and the subframe 41 being somewhat toward the rear of the machine. The subframe member 40 comprises two vertical members 42 and 43 joined rigidly by a horizontal member 44 and braced by diagonal members 45 and 46. The vertical subframe 41 has two vertical members 47 and 48 rigidly connected to a horizontal member 49 and braced by members 50 and 51. The vertical subframe members 40 and 41 are both rigid in themselves and both are pivotally secured across the members 13 and 14 by brackets 40a and pins 40b so that the subframe 12 can fold relative thereto.

The vertical subframes 40 and 41 are connected together by a pair of cross bracing members 52 and 53. The member 53 is bolted to each of the subframes 40 and 41 and is removable therefrom by simple removal of the bolts. The member 52 is pivotally mounted to the member 47 and is provided with a longitudinally extending slot 54. Secured slidably in this slot 54 is a member 55 which is pivotally attached to the member 13 of the subframe 12. When the member 53 is removed (and the pin 67 subsequently described is removed) the subframe 12 and the subframes 40 and 41 can be folded down to a position where the subframes 40 and 41 lie flat (see FIGS. 3 and 4).

Support of the side frames 17 and 18 in their normal erected position as in FIG. 2, is provided by a set of four struts 56, 57, 58, and 59, which are bolted to the legs 42, 47, 43, and 48 of the subframes 40 and 41 and to the bracing members 28, 29, 33, and 34 of the subframe 18. These struts 56, 57, 58 and 59, are removable when the device is to be folded, by removal of their bolts. When the device is erected, they are bolted into place and help to maintain its stability. The outer ends of the members 56, 57, 58, and 59 may comprise clevises held by a bolt which extends through the members 28, 29, etc.

At the forward end of the machine the support of the frame 11 is somewhat different. A Y-frame member 60 is provided with a vertical stem 61 and two branches 62 and 63 which are pivotally secured to the ends of the cross member 15 or to the longitudinal members 13 and 14, respectively by means of brackets 62a and 63a and pivot pins 62b and 63b. Removable bracing members 64 and 65 extend respectively from approximately the vertex 66 of the Y to approximately the centers of the end members 21 and 24. These bracing members 64 and 65 are bolted at both ends and are completely removed when folding the frame 11. The stem 61 is provided with a pin 67 which secures it to a member 67a, the frame of the tomato harvester, and the members 40 and 41 are similarly provided with pins 68 and 69 which hold them rigidly to frame members 68a and 69b of the harvester, in their vertical position, and which are removed when swinging them.

In collapsing the device, it is well first to remove the canopy 10 and store it separately, because it is better protected that way than by being folded with the frame 11. After removal thereof, the cross braces 56, 57, 58, and 59 and the end braces 64 and 65 are completely removed. Then the side subframes 17 and 18 are folded in on top of the central subframe 12. The brace 53 is next removed, leaving the device really supported by the members 52 and 55 and by the end member 60. The pin 67 is pulled from the end member 60 and the pins 68 and 69 from the members 40 and 41, and this enables the sliding connection at the member 52 to be used to move the entire frame 11. The device is erected in the reverse manner. It may readily be taken off the machine, since there are only the five points of support, as indicated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A canopy support device for harvesters, including in combination:
   a horizontal central subframe comprising a pair of longitudinal parallel members joined rigidly by a pair of parallel end members,
   a pair of side subframes, each pivotally supported by said central subframe and of substantially the same width and length, each having a pair of end members and a longitudinal member and each on an opposite side of said central subframe, so that in folded position said subframes lie flat over said central subframe, one over the other, and in use position they extend out to the sides of the central subframe and slope down therefrom,
   forward and rear subframes each pivoted on a horizontal axis to said central subframe for relative movement between a generally vertical use position supporting the central subframe and holding it up and a folded position under said central subframe,
   means for locking said forward and rear subframes in their use position, and
   removal strut members extending from each of said forward and rear subframes in each side subframe for helping to support said side subframes in the use position.

2. The device of claim 1 wherein said forward subframe is Y shaped having a central post and a pair of arms diverging therefrom at a vertex to the ends of the end member at the forward end of said central subframe and pivoted thereto.

3. The device of claim 2 wherein the struts connecting the forward subframe to the side subframes, extend from said vertex to the middle of the forward end members of the side subframes.

4. The device of claim 1 wherein said rear subframe comprises a pair of inverted U-shaped members, each having a cross member bridging between the longitudinal members of said central subframe and normally vertical members extending down therefrom, each U-shaped member being pivoted to said longitudinal members of said central frame, and diagonal bracing members extending from a lower portion of the vertical members of one said U-shaped member to an upper portion of the vertical members of the other said U-shaped members, each said diagonal members lying generally in the vertical plane of one said longitudinal member of said central subframe, and removable struts extending from each said vertical member to said side subframes for support thereof in their use position.

5. The device of claim 4 wherein said side subframes have transverse members lying generally in the same vertical planes as corresponding said U-shaped members, to which said struts are removably secured.

6. The device of claim 4 wherein a first said diagonal member is removable and, when installed, is rigid, while a second said diagonal member comprises a pair of sliding members that remain in position when said first diagonal member is removed, to guide the folding and erecting of said rear subframe relative to said central subframe.

References Cited

UNITED STATES PATENTS

| 2,700,389 | 1/1955 | Butcher et al. | 135—5 |
| 2,734,751 | 2/1956 | Burroughs | 280—32.5 |
| 2,797,822 | 7/1957 | Shaver | 214—5.5 |

FOREIGN PATENTS

| 1,297,203 | 5/1962 | France. |

ROY R. FRAZIER, Primary Examiner

RAYMOND D. KRAUS, Assistant Examiner

U.S. Cl X.R.

135—7.1